United States Patent
Yang et al.

(10) Patent No.: US 9,571,716 B2
(45) Date of Patent: *Feb. 14, 2017

(54) HANDLE FOR HANDHELD TERMINAL (71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/727,239

(22) Filed: Jun. 1, 2015

(65) Prior Publication Data
US 2015/0264165 A1 Sep. 17, 2015

Related U.S. Application Data (63) Continuation of application No. 13/961,670, filed on Aug. 7, 2013, now Pat. No. 9,055,144.

(30) Foreign Application Priority Data

Nov. 28, 2012 (CN) .................... 2012 2 0638696 U
Nov. 28, 2013 (WO) .............................. 2014082378

(51) Int. Cl.
*H04M 1/725* (2006.01)
*H04N 5/232* (2006.01)
*H04N 5/225* (2006.01)
*H04M 1/04* (2006.01)
*H04W 88/02* (2009.01)

(52) U.S. Cl.
CPC ........... *H04N 5/23203* (2013.01); *H04M 1/04* (2013.01); *H04M 1/7253* (2013.01); *H04N 5/2252* (2013.01); *H04N 5/232* (2013.01); *H04N 5/23241* (2013.01); *H04W 88/02* (2013.01)

(58) Field of Classification Search
CPC ........... H04N 5/23203; H04N 5/23241; H04M 1/7253
USPC ................ 455/90.1–90.3, 550.1, 556.1, 557, 575.1, 455/575.3, 575.4
See application file for complete search history.

(56) References Cited

U.S. PATENT DOCUMENTS

| | | |
|---|---|---|
| 5,872,565 A | 2/1999 | Greaves et al. |
| 6,417,797 B1 | 7/2002 | Cousins et al. |
| 6,965,400 B1 | 11/2005 | Haba et al. |
| 6,976,111 B1 | 12/2005 | Mills et al. |
| 7,404,001 B2 | 7/2008 | Campbell et al. |
| 7,412,259 B2 | 8/2008 | Yoo et al. |
| 8,244,299 B1 | 8/2012 | Bishop |
| 8,385,974 B1 | 2/2013 | Bishop |

(Continued)

OTHER PUBLICATIONS

U.S. Appl. No. 13/961,670, filed Aug. 7, 2013, Jinrong Yang, et al.
Zacuto, "iPhone 3gs Accessories Video", Jul. 13, 2009, pp. 1-8.

*Primary Examiner* — Sam Bhattacharya
(74) *Attorney, Agent, or Firm* — Michael Best & Friedrich LLP (57) ABSTRACT

A handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand.

18 Claims, 13 Drawing Sheets

(56) References Cited

U.S. PATENT DOCUMENTS

| | | | |
|---|---|---|---|
| 8,577,412 B1 | 11/2013 | Bishop | |
| 8,832,287 B2 | 9/2014 | Yang et al. | |
| 8,842,155 B2 | 9/2014 | Border et al. | |
| 8,915,660 B1 | 12/2014 | Ben Yehuda et al. | |
| 9,037,128 B2 * | 5/2015 | Yang | H04N 5/23203 455/419 |
| 9,055,144 B2 | 6/2015 | Yang et al. | |
| 2002/0024506 A1 | 2/2002 | Flack et al. | |
| 2002/0044225 A1 | 4/2002 | Rahib | |
| 2002/0183102 A1 | 12/2002 | Withers et al. | |
| 2009/0185040 A1 | 7/2009 | Yang et al. | |
| 2012/0081500 A1 | 4/2012 | Border et al. | |
| 2013/0005401 A1 | 1/2013 | Rosenhan et al. | |
| 2013/0233986 A1 | 9/2013 | Rasheta | |
| 2014/0093229 A1 | 4/2014 | Lecuna Aguerrevere | |
| 2014/0146193 A1 | 5/2014 | Yang et al. | |
| 2014/0179372 A1 * | 6/2014 | Zajeski | H04M 1/7253 455/557 |

* cited by examiner

HANDLE FOR HANDHELD TERMINAL

This application is a continuation-in-part of U.S. patent application Ser. No. 13/961,670, filed Aug. 7, 2013, entitled "Handle for Handheld Terminal", which is hereby incorporated by reference in its entirety.

This application also claims priority to WO/2014/082378, filed Nov. 28, 2013, entitled "One-Hand Manipulation Handle for Hand-Held Terminal", which is hereby incorporated by reference in its entirety.

This application also claims priority to Chinese Application No. 201220638696.7, filed Nov. 28, 2012, entitled "One-Hand Manipulation Handle for Hand-Held Terminal", which is hereby incorporated by reference in its entirety.

BACKGROUND

Field

The present disclosure relates to a handle, in particular to a handle for mobile phone or other handheld terminals that can be used in taking photographs and creating videos.

Description of the Related Art

Handheld terminals, such as mobile phones, are becoming ever more widely used. With the advances in science and technology, the quality of camera technology in handheld terminals taking photos and creating video has improved.

As mobile phone photos or videos have become easier and convenient for timely viewing, transfer and sharing, users of handheld terminals are inspired to take more photos or videos with their handheld terminals. For many people, the frequency of mobile phone shooting has exceeded that of photos taken using a conventional camera. However, a typical mobile phone camera may have features that are not optimized for photography. For example, many handheld terminals are characterized by inconvenient operation, such as poor gripping, and by poor shooting effects. Also, with some handheld terminals, it may be difficult to take photos or videos with one hand.

SUMMARY

Systems and methods are described herein for holding and operating handheld terminal devices, such as mobile phones. According to one embodiment, a handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand. In some embodiments, the handheld terminal is held in a chuck that adjusts to couple to the housing of the handheld terminal. In certain embodiments, the handle allows a user to operate a camera of a mobile phone remotely.

According to one embodiment, a method of using a handheld terminal includes coupling a handle to a handheld terminal comprising a camera, and operating one or more keys on the handle to control one or more operations on the camera.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In some embodiments, a handheld terminal one-hand handle fixes (for example, secures or holds) a mobile phone or other handheld terminal via the handle, operates the mobile phone or handheld terminal shooting function via buttons on the handle. In certain embodiments, remote control operations can also be performed (for example, a non-fixed mode). Illustrative embodiments of a handle are described as below.

In some embodiments, a one-hand handle module include a first wireless interface module and/or the first wired interface module, a first key module, and a first power module. The one-hand handle has a wireless connection with the handheld terminal via the first wireless interface module or has a wired connection via the first wired interface module. The first key module is provided with a user operation command key. The first power supply module supplies work power for the one-hand handle.

A handle base module includes a transformable chuck, handle pillar, and handle tripod. The handle pillar includes a slot sliding plate, buttons, magnets and springs. The buttons and magnets are used to control the slot sliding plate.

When the slot sliding plate is pulled out to the appropriate length and placed in the handheld terminal device, the spring may lock the handheld terminal, fixes via the buttons and the magnets. The sliding of the slot is used to fix the handheld terminal after opening along with the chuck.

In some embodiments, a user operation command keys include one or more of a camera key (or button), video key (or button) and zoom key (or button), camera/video shift key (or button) and zoom key (or button). The first wireless interface module may be WIFI or Bluetooth. The first interface module may be, in various embodiments, a USB interface or an iPhone interface connected with the handheld terminal.

The first key module may be available for users to input command. The first power supply module may include lithium-ion batteries, nickel-cadmium batteries, button batteries or dry batteries, which can be charged and discharged.

The gripping position 12 of the one-hand handle may be equipped with anti-slip material or coating. The USB interface or iPhone interface may be positioned at the handheld terminal behind the handheld base module and the contact surface of the one-hand handle, or the USB interface or iPhone interface is at the side surface of handheld terminal, and can connect with the handheld terminal via the lead. The handheld terminal is mobile phone.

The one-hand handle may include a remote control of the mobile phone. The one-hand handle may have the following advantages (in a mobile phone for example): the handle may realizes the transformation from the behavior pattern of operating the mobile phone for taking pictures or videos to the behavior pattern of one-hand operating mobile phone, controlling the camera or video function of the handheld terminal, so that the handheld terminal is convenient and comfortable holding. The one hand handle may also provide stability and security.

ILLUSTRATIVE EMBODIMENT

Figure 1:
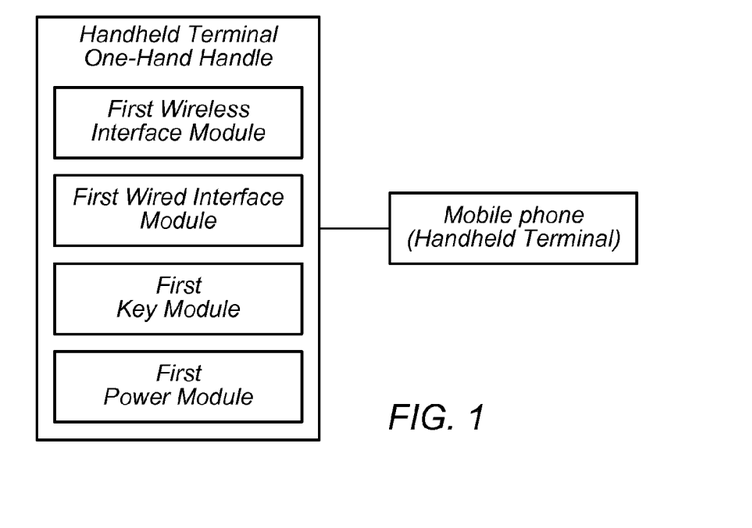
FIG. 1 is the modular structure diagram of a one-hand handle according to one embodiment.

As shown in FIG. 1, it is a modular structure diagram of the one-hand handle of the utility model handheld terminal in the preferred embodiment, the one-handed handle is equipped with handle module and handle base module. The handle comprises of the first wireless interface module and/or the first wired interface module as well as the first key module and the first power module; the handle base comprises of chuck module, handle pillar module and handle foot stand module. The one-hand handle has connection with the handheld terminal via the first wireless interface module, or has wired connection via the first wired interface module.

Figure 2:
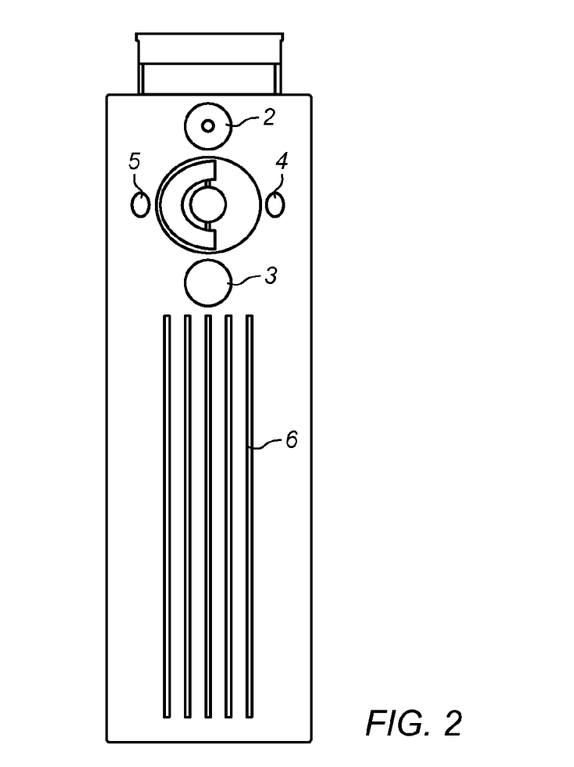
FIG. 2 is the front view illustrating a one-hand handle in one embodiment.
Figure 3:
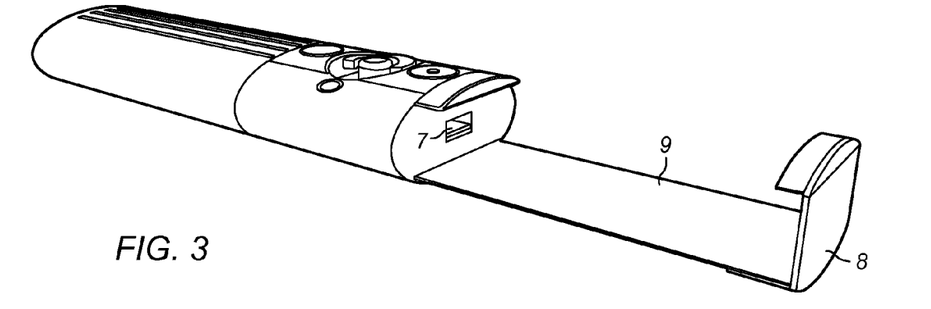
FIG. 3 illustrates the one-hand handle's slot sliding plate pulling state diagram in one embodiment.

As shown in FIG. 2 and FIG. 3, the handle base module comprises of transformable chuck 8, slot sliding plate 9, magnet and spring, the button 1, the magnet, spring, button are used to control the openness and closing of slot sliding plate 9 and the real-time position of the slot sliding plate 9. The slot sliding plate 9 fixes the handheld terminal along with the transformable chuck 8.

The first key module equips with the user operation command key. The first power supply module supplies work power for the one-handed handle. The gripping position of the one-hand handle is also equipped with anti-slip material or member. This embodiment may include slots, such as slot 6.

The first key module may be available for users to input commands. The user operation command keys may include a camera key or button, video key or button and zoom key or button (e.g., zoom in or zoom out), or camera/video shift key and zoom key or button, or combinations thereof. FIG. 2 shows an example arrangement of keys, including the camera key 2, camera/video shift key, first zoom key 4, and second zoom button 5. The first zoom key 4 and the second zoom key 5 may correspond to the objects with different focal lengths.

A wireless interface module may be, in various embodiments, WIFI or Bluetooth. An interface module may include a USB interface or IPhone interface connected with the handheld terminal.

In some embodiments, the first power supply module is lithium-ion batteries, nickel-cadmium batteries, button batteries or dry batteries, which can be charged and discharged.

As shown in FIG. 3, an interface (for example, USB or iPhone) is positioned at the handheld terminal behind the handheld base module and the contact surface of the one-hand handle. In one embodiment, interface 7 may be the interface connecting with an iPhone. In another embodiment, the USB interface or iPhone interface may be at the side surface of handheld terminal and can connect with the handheld terminal via the lead.

Figure 4:
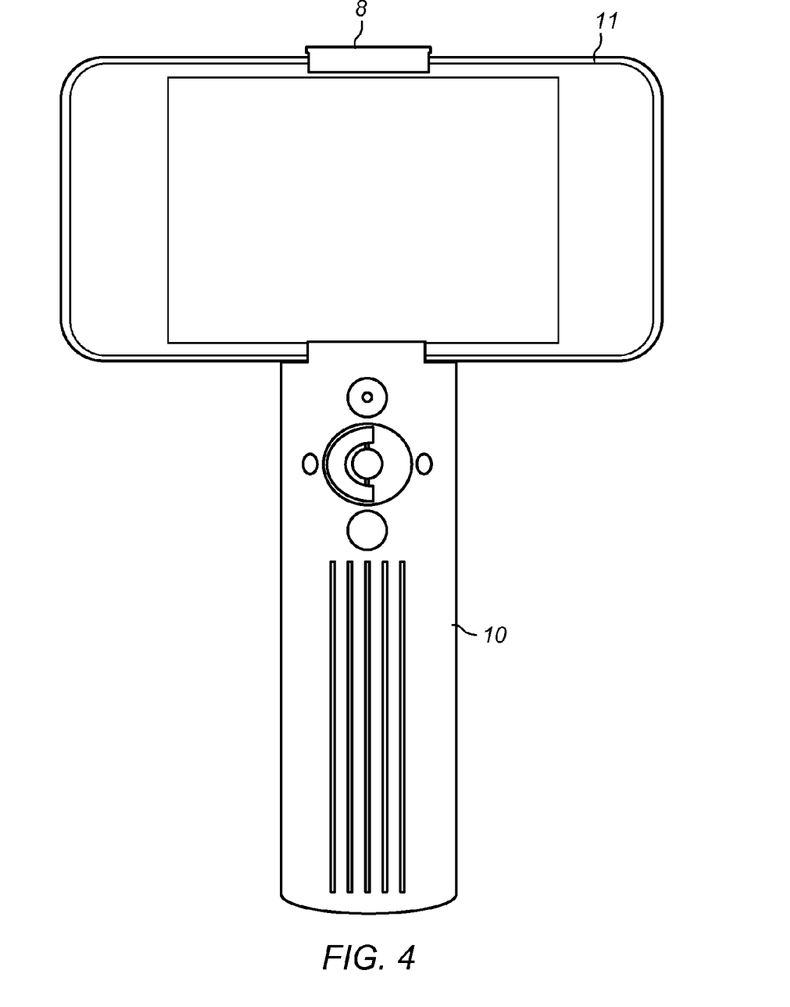
FIG. 4 illustrates a fixed mobile phone one-hand handle's usage state diagram in one embodiment.

In some embodiments, the handheld terminal being held by a handle is a mobile phone. FIG. 4 illustrates a mobile phone held in a chuck of a handle. One or more magnets, springs, and buttons of handle 10 may be used to control the opening and closing of slot sliding plate 9, and holding of handheld 11 in the chuck. The real-time position of the slot sliding plate 9, the slot sliding plate 9 fixes the handheld terminal along with the transformable chuck 8. After being positioned, the slot sliding plate 9 will not move up and down, thus one-hand operating the mobile phone command will become much easier.

In some embodiments, a one-hand handle can also be used as the remote control of the mobile phone.

Figure 5A:
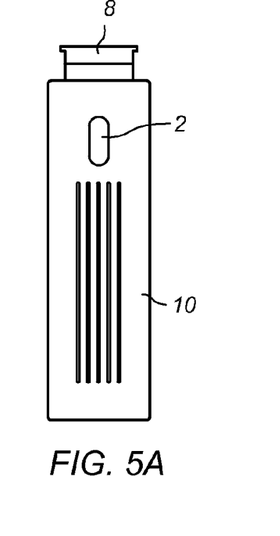
FIGS. 5A-5D illustrate a one-hand handle, according to some embodiments.

FIGS. 5A-5D illustrate a one-hand handle, according to some embodiments. FIGS. 5A-5D illustrate various configurations of a one-hand handle. For example, FIG. 5A illustrates a one-hand handle with camera key 2 and transformable chuck 8. In the illustrated embodiment, the one-hand handle is not physically attached to a device, but, the one-hand handle may be wirelessly connected to a device so as to function as a remote control. For instance, the depicted one-hand handle may be operated via camera key 2 such that operation of the camera key 2 causes a wirelessly-attached device to perform a function, such as capture an image.

Figure 5B:
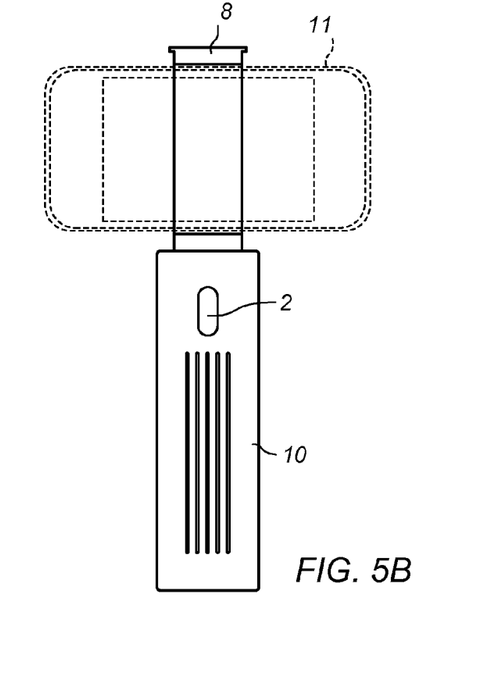

FIG. 5B depicts a one-hand handle with camera key 2, and transformable chuck 8 that is configured to hold handheld device 11. In the illustrated embodiment, the transformable chuck 8 has been extended upward from the handle body (e.g., against a spring, for example) and handheld device 11 has been placed into an area between the chuck 8 and the handle 10. In embodiments, a spring or other mechanism may hold the chuck against the handheld device 11, so as to affix the handheld device 11 to the one-hand handle. The handheld device 11 is depicted with dotted lines to allow the extended chuck to be depicted in the illustration. The depicted one-hand handle may be operated via camera key 2 such that operation of the camera key 2 causes handheld device 11 to perform a function, such as capture an image, although other functions are contemplated as well.

Figure 5C:
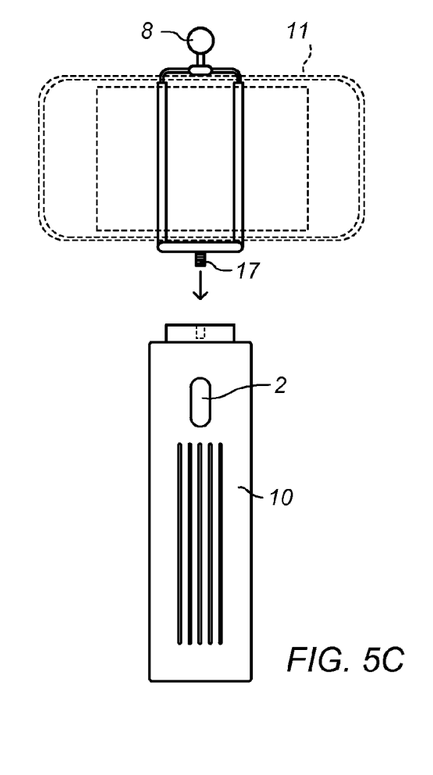

FIG. 5C illustrated a one-hand handle, in another embodiment. In the depicted embodiment, a transformable chuck 8 is illustrated holding a handheld device 11 and the one-hand handle has been separated from the transformable chuck such that the one-hand handle can be operated remotely from the handheld device as a remote control. In the illustrated embodiment, mechanism 17 is illustrated for attaching/detaching the one-hand handle from the transformable chuck 8. In a non-exhaustive list of examples, mechanism 17 may include some combination of spring, magnet, button, screw, threads sliding plate or the like.

Figure 5D:
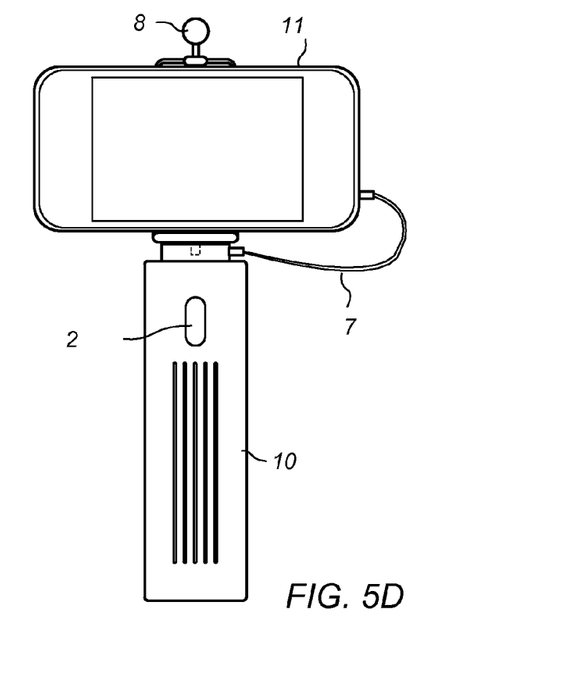

FIG. 5D depicts a one-hand handle in a wired embodiment. The one-hand handle is illustrated with wire 7 between the first wired interface module and the handheld device 11. Wire 7 may provide a connection between the handheld device 11 and the one-hand handle. For instance, the wire 7 may be configured to provide battery power from the handle to the handheld device and/or the wire 7 may be configured to provide an interface for sending control signals from the one-hand handle to the handheld device 11, in response to selection of button 2, for example.

Figure 6:
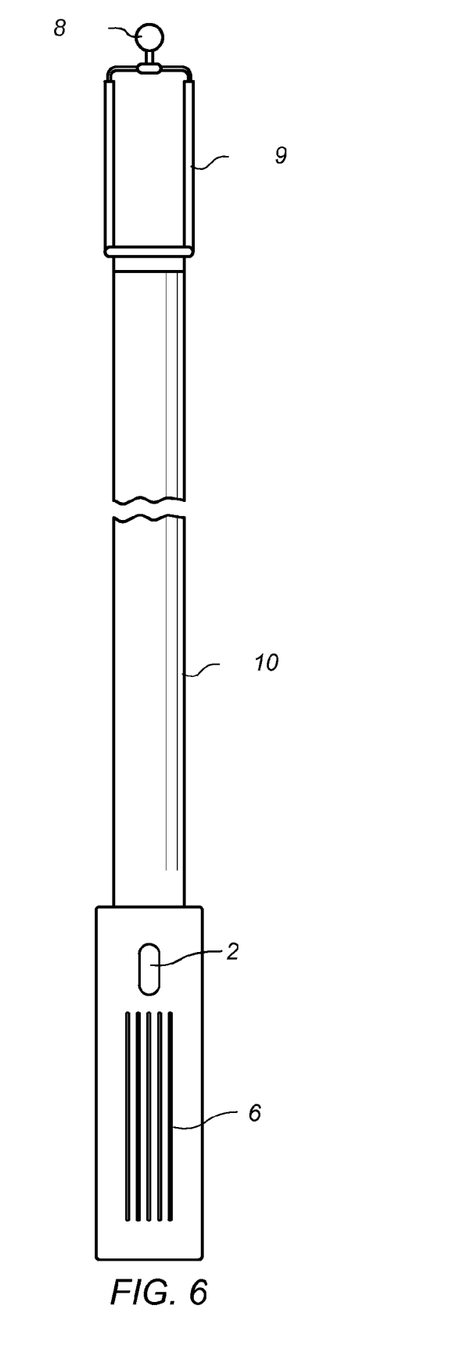
FIG. 6 illustrates a one-hand handle, according to some embodiments.

FIG. 6 illustrates a one-hand handle, according to some embodiments. In the depicted embodiment, handle 10 is illustrated with sliding plate 9 of the transformable chuck 8, camera key 2 and gripping slots 6. In the depicted embodiment, handle 10 is depicted with an elongated handle 10.

Figure 7:
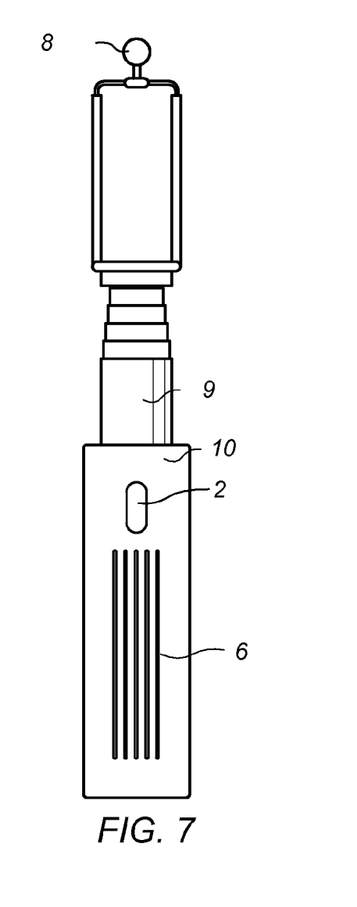
FIG. 7 illustrates a one-hand handle, according to some embodiments.

FIG. 7 illustrates a one-hand handle, according to some embodiments. In the depicted embodiment, handle 10 is illustrated with transformable chuck 8, sliding plates 9, camera key 2 and gripping slots 6. The sliding plates 9 are depicted in a closed or compressed state, but may be slidably-extended so as to increase the length of the handle, in embodiments. Mechanical device, such as buttons, magnets and/or springs may be configured to control the sliding plates 9, in embodiments.

Figure 8:
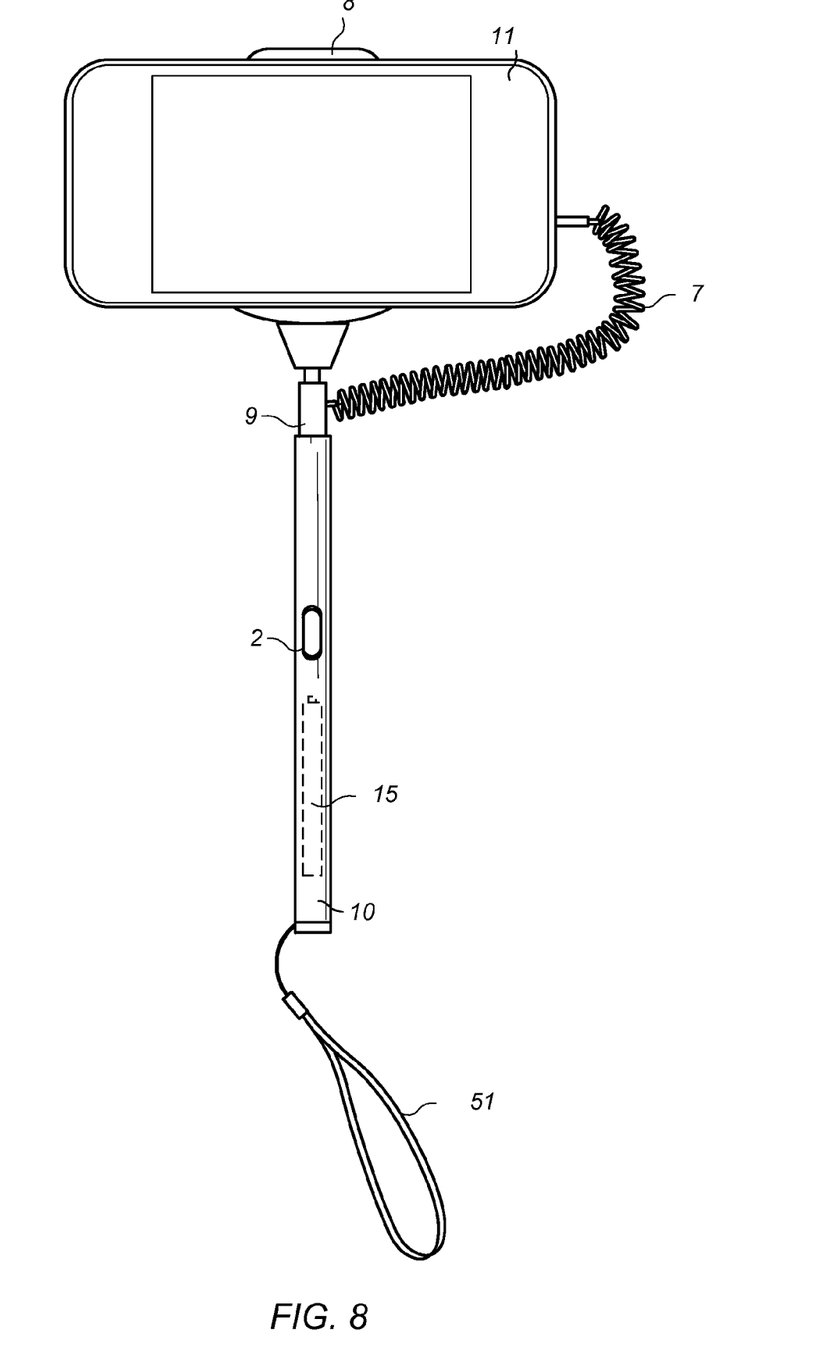
FIG. 8 illustrates a one-hand handle with a wired connection, according to some embodiments.

FIG. 8 illustrates a one-hand handle with a wired connection, according to some embodiments. In the depicted embodiment, handle 10 is illustrated with transformable chuck 8, battery 15, sliding plates 9, camera key 2 and wire 7. The sliding plates 9 are depicted in a closed or compressed state, but may be slidably-extended so as to increase the length of the handle, in embodiments. Mechanical device, such as buttons, magnets and/or springs may be configured to control the sliding plates 9, in embodiments.

FIG. 8 illustrates a wired embodiment. The one-hand handle 10 is illustrated with wire 7 between the handle 10 and the handheld device 11. Wire 7 may provide a connection between the handheld device 11 and the one-hand handle. For instance, the wire 7 may be configured to provide battery power from the handle to the handheld device and/or the wire 7 may be configured to provide an interface for sending control signals from the one-hand handle to the handheld device 11, in response to selection of button 2, for example. In some embodiments, the battery 15 may provide power for the handle 10, to power the wireless interface to the handheld device, for example. The one-hand handle is depicted with a safety loop 51 attached to the handle.

Figure 9:
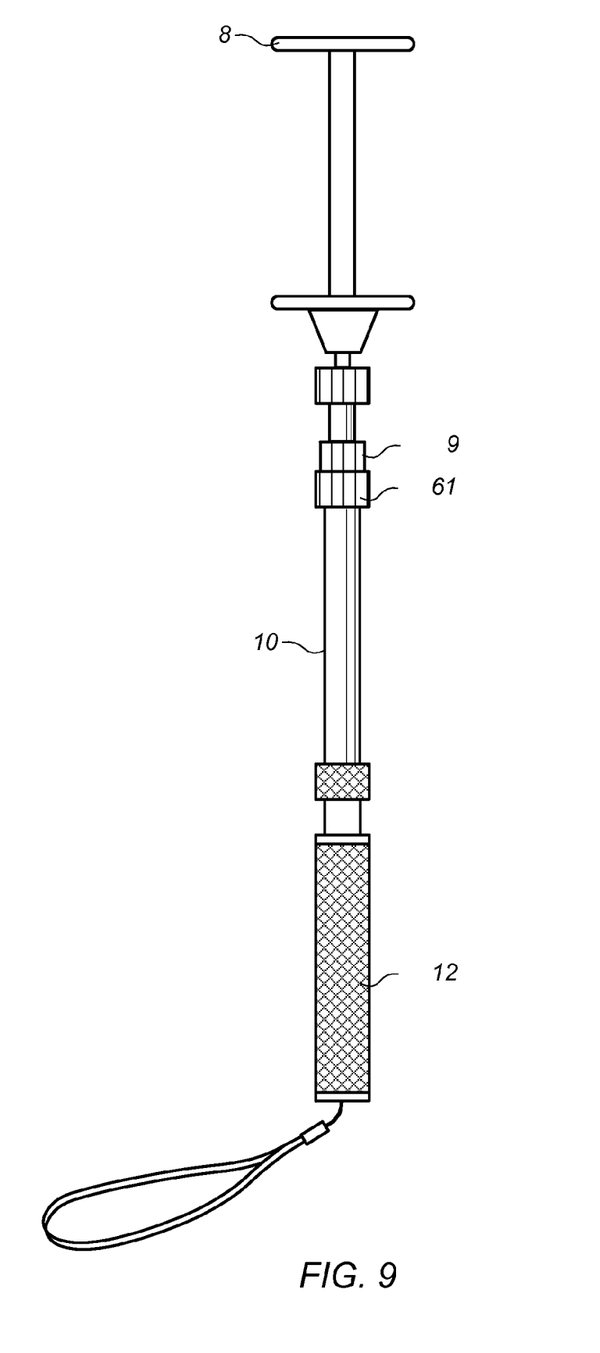
FIG. 9 illustrates a one-hand handle with gripping material, according to some embodiments.

FIG. 9 illustrates a one-hand handle with gripping material, according to some embodiments. In the illustrate embodiment, the handle 10 is depicted with sliding plates 9, transformable chuck 8 and grip material 12. Sliding plates 9 are illustrated in a compressed or closed position, but may be slidably extended, in embodiments. In the depicted embodiment, the one-hand handle is depicted with collar(s) 61 that may be configured to adjust the friction fit between the sliding plates 9 of the extendable and collapsible handle 10. In some embodiments, collar(s) 61 may be loosened or tightened to allow the sliding plates (e.g., telescoping tubes or the like) to slide past one another to extend or collapse, or remain rigidly in place, respectively.

Figure 10:
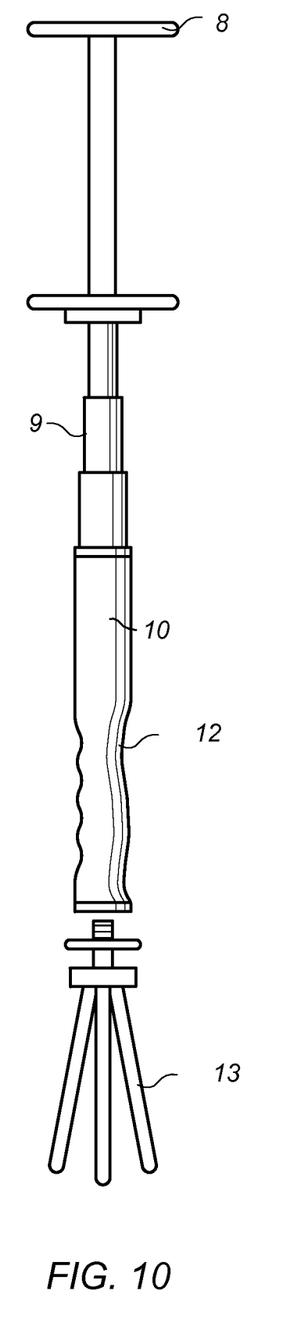
FIG. 10 illustrates a one-hand handle with a tri-pod, according to some embodiments.

FIG. 10 illustrates a one-hand handle with a tri-pod, according to some embodiments. Handle 10 is depicted with grip 12, sliding plates 9, tripod 13, and transformable chuck 8. In the depicted embodiment, the tripod 13 may be releasably connected to handle 10, via a mechanical connection, such as various arrangements of buttons, magnets, springs, threads, screws or the like.

Figure 11:
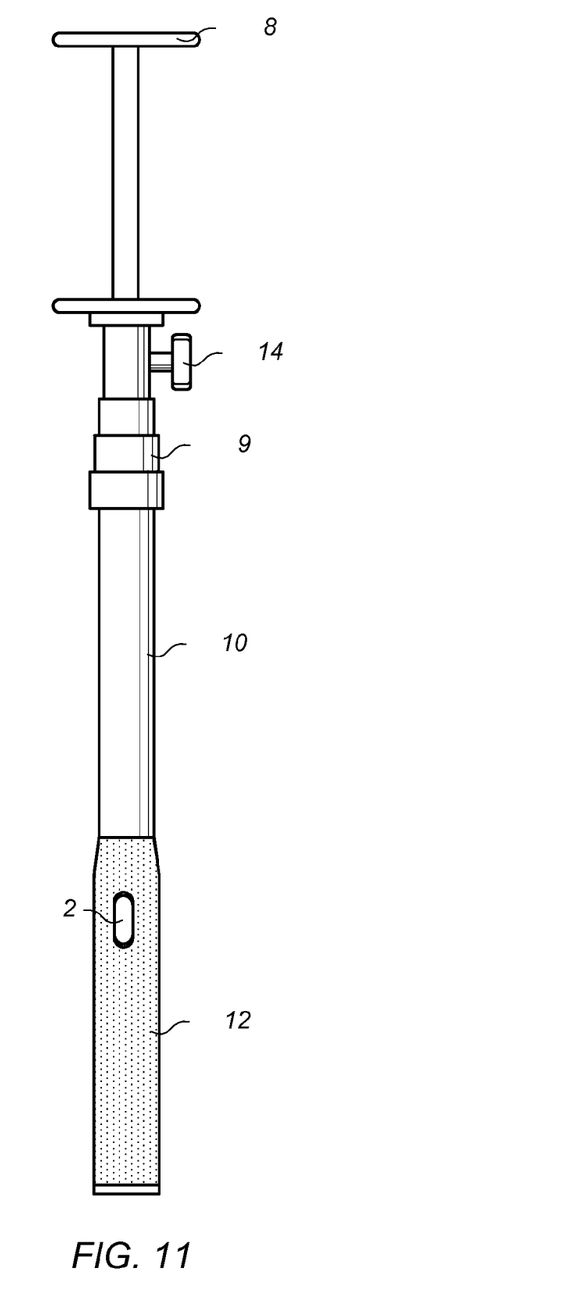
FIG. 11 illustrates a one-hand handle, according to some embodiments.

FIG. 11 illustrates a one-hand handle, according to some embodiments. Handle 10 is depicted with grip material 12, camera key 2, sliding plates 9, knob 14 and transformable chuck 8. In embodiments, knob 14 may be configured to control articulation of the transformable chuck with relation to the handle 10, in embodiments. In some embodiments, the knob 14 may be configured to adjust a friction fit elbow that provides articulation of the mechanism that couples the handle to the electronic device held by the handle.

Figure 12:
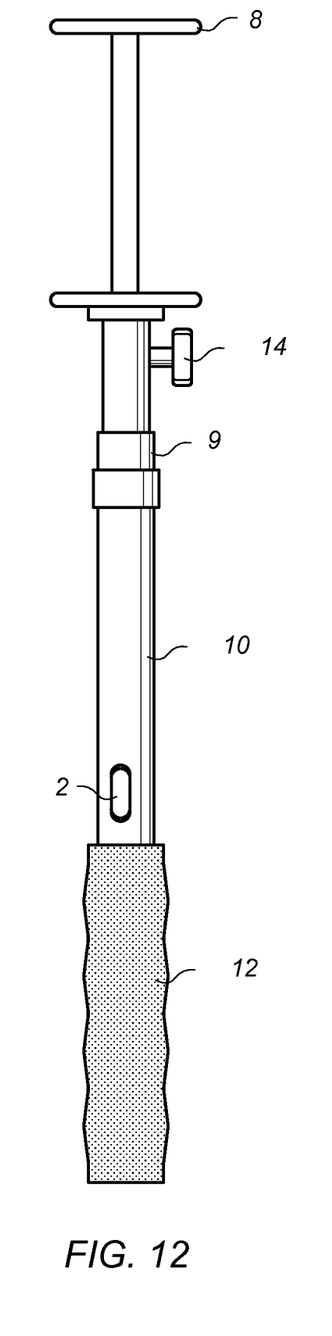
FIG. 12 illustrates a one-hand handle with gripping material, according to some embodiments.

FIG. 12 illustrates a one-hand handle with gripping material, according to some embodiments. Handle 10 is depicted with grip material 12, camera key 2, sliding plates 9, knob 14 and transformable chuck 8. In embodiments, knob 14 may be configured to control articulation of a coupler (e.g., the transformable chuck) with relation to the handle 10, in embodiments. Knob 14 may be configured to adjust the tightness of a friction fit between the sections of the telescoping segment.

Figure 13:
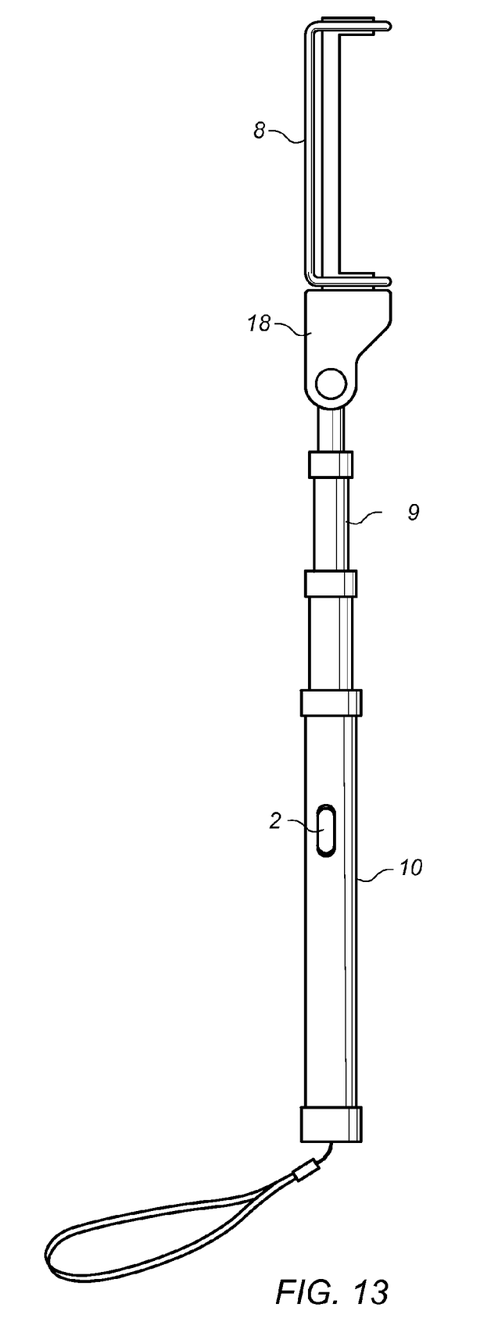
FIG. 13 illustrates a one-hand handle with a battery, according to some embodiments.

FIG. 13 illustrates a one-hand handle, according to some embodiments. In the illustrated embodiment, the handle 10 is depicted with chuck 8, rotational head 18, sliding plates 9 and camera key 2. Chuck 8 is depicted with a friction fit mechanism that relies upon an interference-based fit between the chuck 8 and the device held by the chuck. Rotational head 18 is depicted and may provide for the chuck 8 to rotate about the handle 10, in embodiments.

Figure 14:
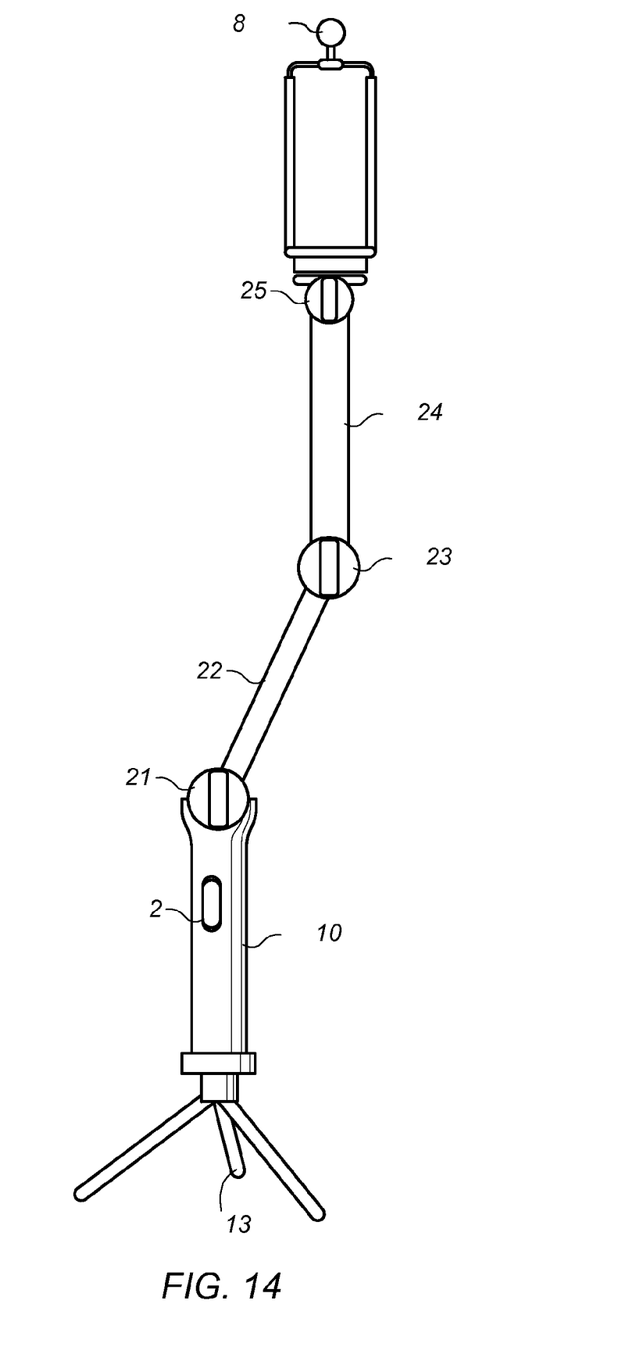
FIG. 14 illustrates a one-hand handle with a flexible body, according to some embodiments.

FIG. 14 illustrates a one-hand handle with a flexible body, according to some embodiments. In the depicted embodiment, the handle 10 is configured with camera key 2, tripod base 13, a first joint 21, a first segment 22, a second joint 23, a second segment 24, a third joint 25, and a transformable chuck 8. In various embodiments, the handle 10 provides a configurable orientation for holding a device via chuck 8. For example, joints 21, 23 and 25 are configured to provide rotation such that the segments 22 and 24 can be oriented at various angles to one another. Joints 21, 23 and 25 may be configured as adjustable friction-fit joints (e.g., adjustable via one or more knobs or the like), in embodiments. Segments 22 and 24 may be configured as telescoping segments, in some embodiments. In embodiments, the handle 10 may be configured with a removable tripod 13.

Figure 15:
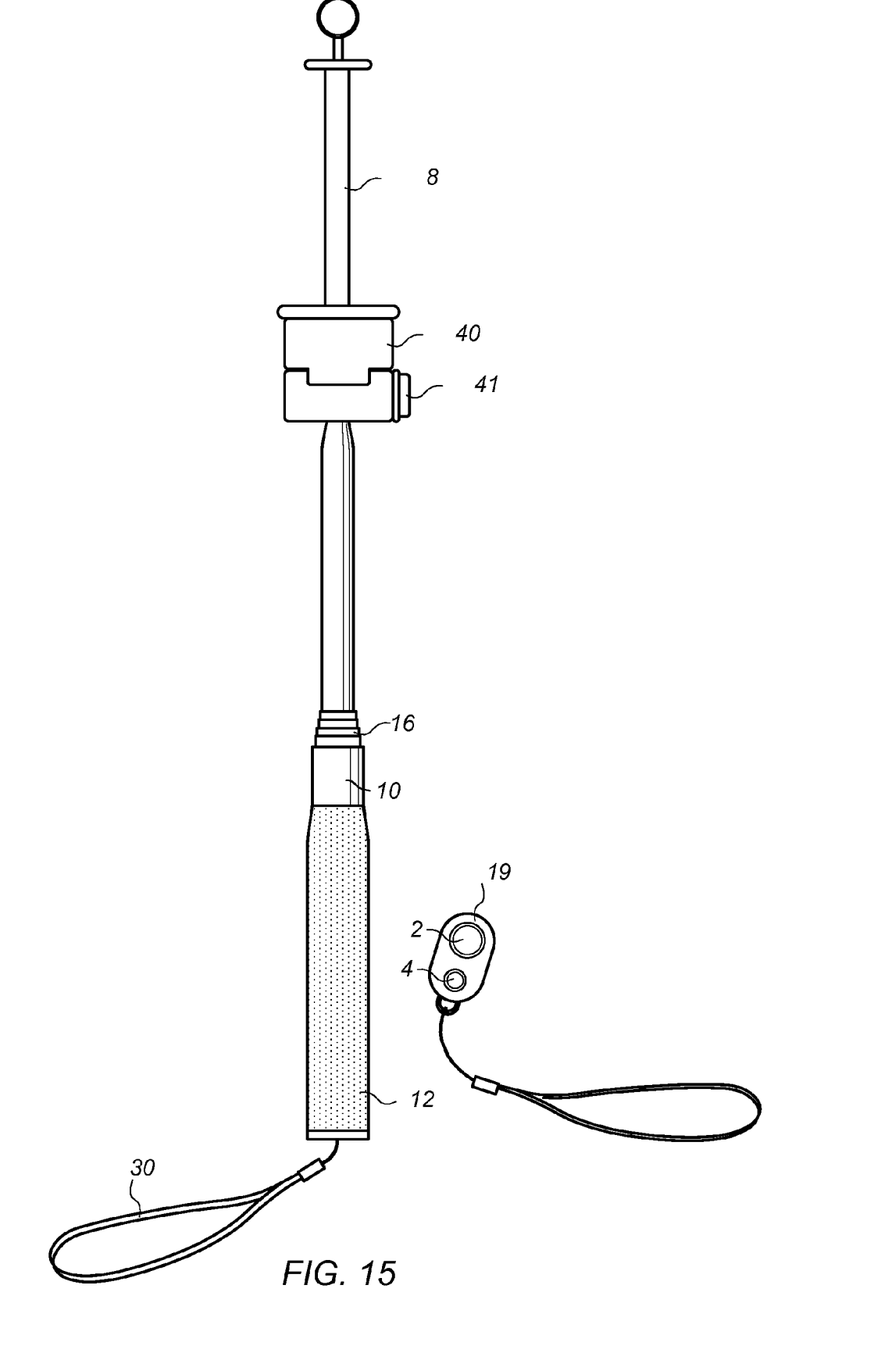
FIG. 15 illustrates a telescoping one-hand handle and a remote control, according to some embodiments.

FIG. 15 illustrates a telescoping one-hand handle and a remote control, according to some embodiments. In the illustrated embodiment, the handle 10 is depicted with grip area 12, telescoping segment 16, rotational assembly 40 and 41 and chuck 8. A remote control 19 is depicted with camera key 2 and zoom key 4. A remote control with buttons for controlling other features is contemplated as well. Telescoping segment 16 may be configured to extend the length of the handle. For example, telescoping segment 16 may include a set of tubes stacked inside one another with an interference fit, such that the tubes may be slidably extended past one another to form an extended handle. Rotational assembly 40 and 41 are illustrated and depict a rotational joint that provides for rotation of the chuck with respect to the handle.

Figure 16:
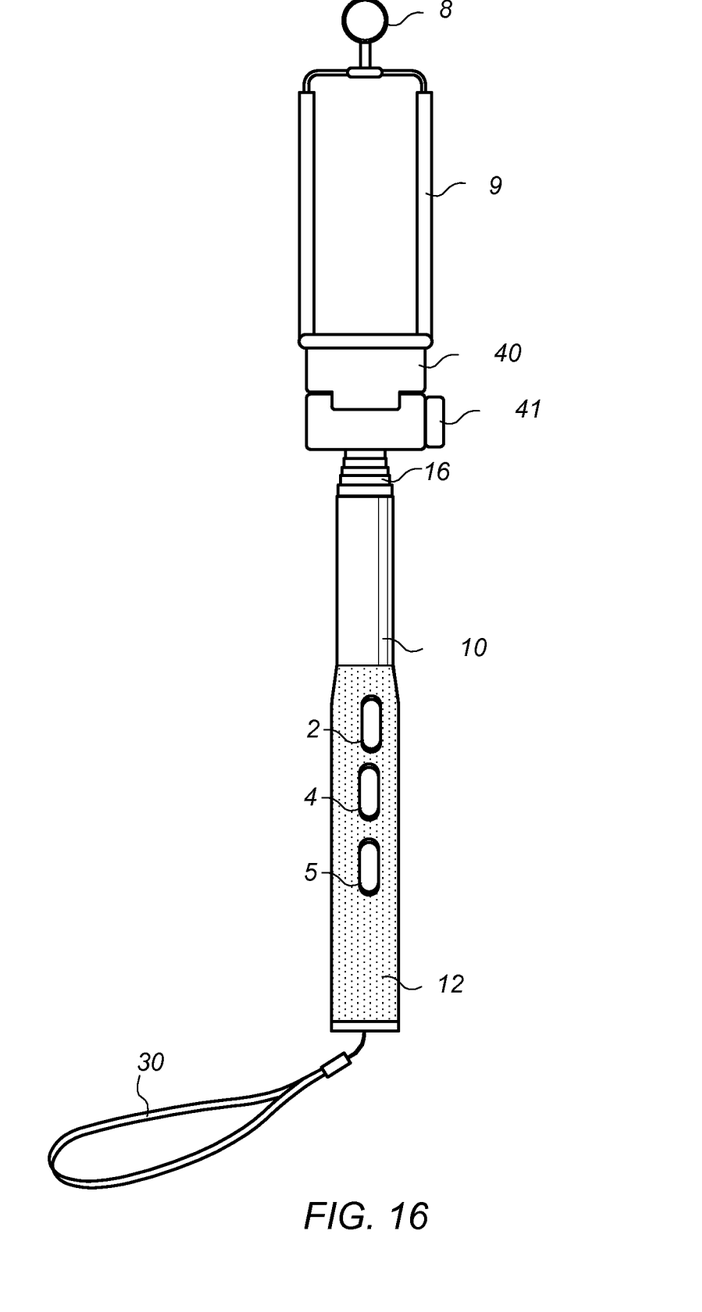
FIG. 16 illustrates a telescoping one-hand handle with multiple buttons, according to some embodiments.

FIG. 16 illustrates a telescoping one-hand handle with multiple buttons, according to some embodiments. In the illustrated embodiment, the handle 10 is depicted with grip area 12, telescoping segment 16, rotational assembly 40 and 41, chuck 8 and sliding plate 9. Handle 10 is depicted with camera key 2, first zoom key 4 (e.g., zoom out) and second zoom key 5 (e.g., zoom in). Telescoping segment 16 may be configured to extend the length of the handle. For example, telescoping segment 16 may include a set of tubes stacked inside one another with an interference fit, such that the tubes may be slidably extended past one another to form an extended handle. Rotational assembly 40 and 41 are illustrated and depict a rotational joint that provides for rotation of the chuck with respect to the handle. Handle 10 is depicted with safety loop 30.

The various methods as illustrated in the figures and described herein represent exemplary embodiments of systems and methods. The systems and methods may be implemented manually, in software, in hardware, or a combination thereof. The order of any method may be changed, and various elements may be added, reordered, combined, omitted, modified, etc. Additionally, various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A device, comprising:
   a handle for holding a mobile phone, wherein the handle couples via coupler to the mobile phone and provides for one-handed operation of the mobile phone, the handle comprising:
      a power supply module with one or more batteries;
      a gripping position comprising anti-slip material;
      an interface module configured to provide a Bluetooth connection to the mobile phone, wherein the handle is configured to provide remote control of one or more features of the mobile phone via the interface module; and
      at least one command key, that when operated, directs the interface module to send a command to the mobile phone to control a feature of the mobile phone;
   wherein the handle controls an orientation of the mobile phone, and wherein the handle can be held with one hand such that the mobile phone can be held via the handle with one hand and such that the one hand can operate user-operated command key while the one hand is also holding the handle, and
   the handle further comprises a telescoping segment configured to telescopically extend a length of the handle.

2. The device of claim 1, wherein the handle further comprises a wire connector configured to connect to the mobile phone.

3. The device of claim 2, wherein the wire connector is configured to provide a data connection between the command key and the mobile phone or a power connection between the power supply and the mobile phone.

4. The device of claim 1, wherein the telescoping segment is further configured with a knob configured to adjust a tightness of a friction-fit between one or more sections of the telescoping segment.

5. The device of claim 1, wherein the handle is configured to couple to the mobile phone via spring-based coupling mechanism.

6. The device of claim 1, wherein the handle further comprises a knob configured to control articulation of the coupler with relation to the handle.

7. The device of claim 1, wherein the handle comprises three or more command keys comprising a camera key, first zoom key, and second zoom key.

8. The device of claim 1, wherein when coupled to the mobile phone, the handle transforms the mobile phone from a device configured for direct two-handed holding and operation to a device configured for indirect one-handed holding and operation via the handle.

9. The device of claim 8, wherein the handle, when coupled to the mobile phone, provides stable and secure hold and control of the mobile phone.

10. The handle of claim 1, wherein the handle provides the remote control of the mobile phone irrespective of whether the handle is physically coupled to the mobile phone.

11. A device, comprising:
    a handle for holding a mobile phone, wherein the handle couples via coupler to the mobile phone and provides for one-handed operation of the mobile phone, the handle comprising:
       a power supply module with one or more batteries; and
       a gripping position comprising anti-slip material;
    the device further comprising:
       an interface module configured to provide a Bluetooth connection to the mobile phone, wherein the handle is configured to provide remote control of one or more features of the mobile phone via the interface module; and
       at least one command button, that when operated, directs the interface module to send a command to the mobile phone to control a feature of the mobile phone;
    wherein the handle controls an orientation of the mobile phone, and wherein the handle can be held with one hand such that the mobile phone can be held via the handle and such that the at least one command button can be operated while the one hand is holding the mobile phone via the handle, and
    the handle further comprises a telescoping segment configured to extend a length of the handle.

12. The device of claim 11, wherein the handle further comprises a wire connector configured to connect to the mobile phone.

13. The device of claim 12, wherein the wire connector is configured to provide a data connection between the command button and the mobile phone or a power connection between the power supply and the mobile phone.

14. The device of claim 11, wherein the telescoping segment is further configured with a knob configured to adjust a tightness of a friction-fit between one or more sections of the telescoping segment.

15. The device of claim 11, wherein the handle is configured to couple to the mobile phone via transformable chuck.

16. The device of claim 11, wherein the handle further comprises a knob configured to control articulation of the coupler with relation to the handle.

17. The device of claim 11, wherein the handle comprises three or more command buttons comprising a camera button, first zoom button, and second zoom button.

18. The device of claim 11, wherein when coupled to the mobile phone, the handle transforms the mobile phone from a device configured for direct two-handed holding and operation to a device configured for indirect one-handed holding and operation via the handle.

* * * * *

Disclaimer

9,571,716 B2 - Jinrong Yang, Shanghai (CN); Ramzi Khalil Maalouf, Chevy Chase, MD (US). HANDLE FOR HANDHELD TERMINAL. Patent dated February 14, 2017. Disclaimer filed June 10, 2019, by the assignee, DARELTECH LLC.

I hereby disclaim the following complete claims 4, 5, 6, 14 and 16 of said patent.

*(Official Gazette, October 25, 2022)*